April 22, 1958 D. B. KLEASON ET AL 2,832,012

MAGNETIC AMPLIFIER STRUCTURE

Filed Feb. 11, 1954 2 Sheets-Sheet 1

INVENTOR.
DEMETRIUS B. KLEASON
WILLIAM T. WILLIAMS
BY
George H Fisher
ATTORNEY

April 22, 1958 D. B. KLEASON ET AL 2,832,012

MAGNETIC AMPLIFIER STRUCTURE

Filed Feb. 11, 1954 2 Sheets-Sheet 2

INVENTOR.
DEMETRIUS B. KLEASON
WILLIAM T. WILLIAMS
BY George H Fisher
ATTORNEY 2,832,012

MAGNETIC AMPLIFIER STRUCTURE

Demetrius B. Kleason, St. Paul, and William T. Williams, Minneapolis, Minn., assignors to Minneapolis-Honeywell Regulator Company, Minneapolis, Minn., a corporation of Delaware Application February 11, 1954, Serial No. 409,748

4 Claims. (Cl. 317—99)

This invention relates to magnetic amplifiers and more specifically to a novel and improved structure and packaging arrangement for magnetic amplifiers.

Present day applications of magnetic amplifiers and associated equipment, such as in aircraft use, require that the units be compact, shockproof, impervious to moisture, unaffected by continuous vibration or high acceleration rates, and be able to operate over relatively long periods of time with a minimum of maintenance. Applications have invented a new and improved method of packaging magnetic amplifiers to provide the above mentioned and other requirements. Very broadly the invention includes the mounting of toroidal cores on a single mandrel or shaft to provide a very compact unit, and then potting the assembled cores with a suitable potting compound to make the unit rigid and impervious to moisture.

An object of this invention is to provide a new and improved packaging arrangement for magnetic amplifiers.

Another object of this invention is to provide a new and improved packaging arrangement for magnetic amplifiers which use saturable circular or toroidal cores.

A further object is to provide a new and novel packaging arrangement for a magnetic amplifier which is compact and very rugged.

These and other objects which characterize our invention are pointed out with particularity in the claims annexed to and forming a part of this specification. For a better understanding of this invention, reference should be made to the accompanying drawing and descriptive matter in which we have illustrated and described a preferred embodiment of the invention.

Figure 1:
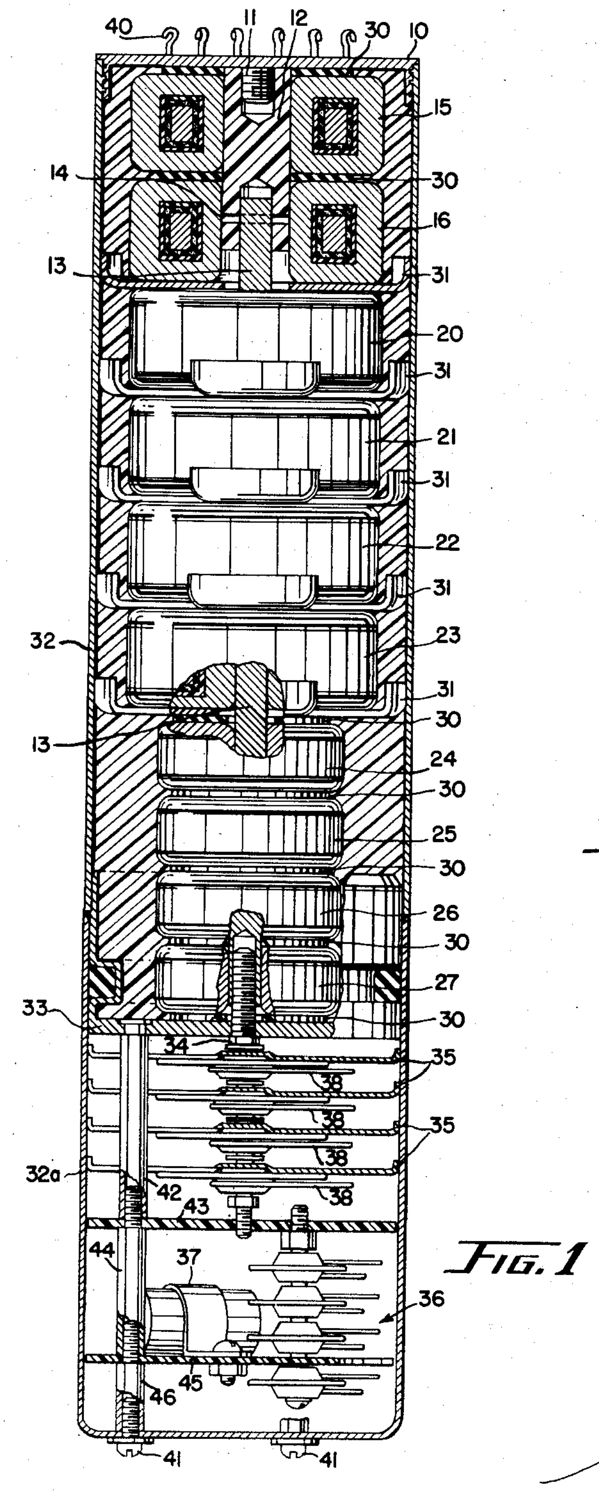
Figure 1 is a partial sectional view of the magnetic amplifier structure.
Figure 2:
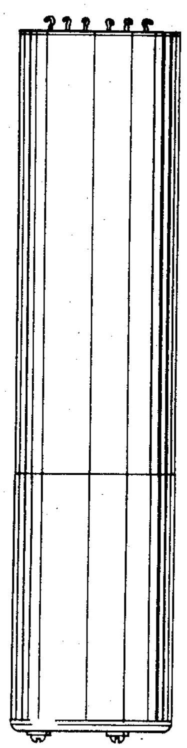
Figure 2 is an elevation view of the exterior of the assembled amplifier.
Figure 3:
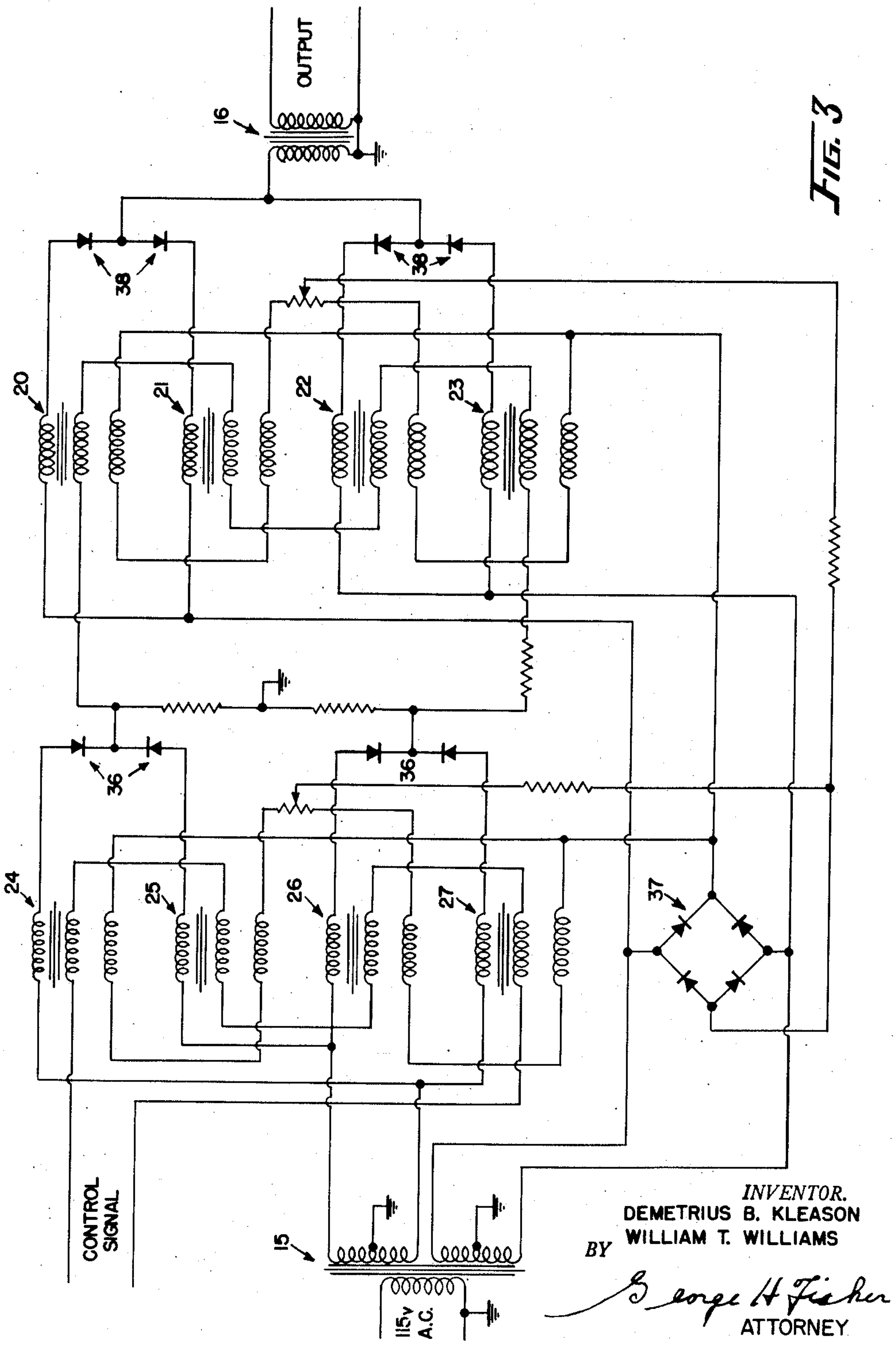
Figure 3 is a schematic circuit diagram of a previously known type of magnetic amplifier suitable for packaging according to applicants' invention.

Figure 1 discloses a magnetic amplifier structure having a circular metal base plate 10 which has a threaded stud bolt 11 fastened to the center of the plate. A cylindrical center post 12 of insulating material has a hole drilled axially into each of its ends, one end of which is tapped and screwed onto the stud, thus securely fastening the post 12 to the base plate. One end of a metallic center rod 13 or spindle is fastened into the other hole in the post by any suitable means such as a pin 14 extending through the post and rod. The amplifier includes a plurality of coils which are wound on circular or toroidal saturable cores. These core structures are shown in detail in a copending application of Alexander Bezat entitled "Magnetic Core Structures," Serial No. 311,459, filed September 25, 1952, and assigned to the assignee of the present invention. The coils are assembled on the post and rod, which may be rubber coated to provide shock mounting for the coils. If a magnetic amplifier doubler circuit such as is shown in Figure 3 is taken as an example of an amplifier which adapts itself readily to this invention, the coils in Figure 1 may represent a power transformer 15, an output transformer 16, power stage reactors 20, 21, 22 and 23, and first stage reactors 24, 25, 26 and 27. A number of spacers 30, preferably of resilient rubber, are inserted between the cores to separate them and to provide a shock mount or cushioning of the cores. The power stage reactors 20—23 which handle a relatively large amount of power must dissipate a considerable amount of heat and a plurality of annular metal discs 31 having a high thermal conductivity are utilized for the purpose of heat dissipation. The discs, which are inserted between adjacent power reactor cores, have a flange at the circumference of the discs, and these flanges make contact with a cylindrical metal shell 32 which encloses the assembly. The heat generated in the reactors flows radially out through the discs to the shell from which it is dissipated to the surrounding atmosphere. A metal header 33 is fastened to the end of the center rod 13 by a bolt 34. The bolt is tightened to draw the header snugly against the coils and thus firmly hold the coils together as a solid unit. The header and base plate also serve as supports for the metal shell. The heat accumulated on the center rod during operation is partially dissipated from the rod to the metal shell through the header. To insure a more rigid unit the above described assembly is filled with a suitable potting compound such as a resin potting material.

The magnetic amplifier also includes several other components such as rectifiers and resistors which are not sealed in the potting material. These include power stage rectifiers 38, first stage rectifiers 36, a bias rectifier 37, and resistors and potentiometers (not shown in Figure 1). These elements have been identified by the same numbers in Figures 1 and 3. These rectifiers do not have as long a life expectancy as the reactors and are mounted substantially as shown so they may be replaced if necessary. The cap end 32_a_ of the shell 32 may be removed from the assembly by removing screws 41. By removing the cap end access is gained to the rectifiers and resistors, previously mentioned. A plurality of support posts 42 are staked to the header 33 and have the lower ends thereof tapped. A rectifier support board 43 is securely attached to the posts 42 by supports posts 44 which are threaded at the upper end and which are screwed into post 42. Likewise a resistor support board 45 is fastened to the lower ends of support posts 44. A plurality of support posts 46 are also threaded at the upper end and tapped at the lower end and the threaded end of the posts are passed through holes in board 45 and screwed into the lower end of posts 44, thus securing the board 45. The lower end of support posts 46 are tapped to receive the screws 41 which secure the cap end 32_a_. The above discussed rectifier resistor section of the structure may be disassembled if necessary to replace faulty units. The rectifiers 38, preferably of the selenium type, are shown having discs 35 extending out to make contact with the cap end 32_a_ of the shell 32 for the purpose of removing heat from the rectifiers. The electric terminals of the amplifier are shown as a plurality of pins 40; however, the terminals may be brought out through any suitable type connector or terminal block.

For simplification of the explanation of the structure, none of the wiring which interconnects the components of the magnetic amplifier structure have been shown in Figure 1. The connections are shown schematically, however, in Figure 3.

Many changes and modifications of this invention will undoubtedly occur to those who are skilled in the art and we therefore wish it to be understood that we intend to be limited by the scope of the appended claims and not by the specific embodiment of our invention which is disclosed herein for the purpose of illustration only.

We claim as our invention:

1. A sealed magnetic amplifier structure comprising in combination: a first base member; a centrally located supporting spindle member attached to and projecting transversely from said base member; a plurality of magnetic cores each having windings thereon and having a centrally located aperture therein positioned on and encircling said spindle member; means securing said cores on said supporting member; first fixed tubular casing means positioned around said cores and said supporting member and sealed to said base member; a plurality of heat conductive means positioned between some of said cores and making contact with said casing means for dissipating the heat generated in said cores to said casing; insulating means mounted between the rest of said cores and between said cores and said supporting member; insulating resin material filling the voids within said structure; a second base member attached to said supporting member remote from said first base member; second supporting means attached to said second base member; a plurality of nonlinear impedance members detachably mounted on said second removable tubular supporting means; a second casing means positioned around said impedance members and said second supporting means and abutting said first casing means; and means removably securing said second casing means to said base member, so that said impedance members may be replaced on removal of said second removable casing means.

2. A magnetic amplifier unit having a plurality of toroidal saturable core transformer windings and rectifier means, a central supporting spindle, said magnetic amplifier unit being in the form of a single sealed enclosed assembly where said plurality of toroidal windings are adjacently mounted and axially clamped upon said spindle, a two part cover member having a fixed portion and a removable portion, said fixed portion enclosing said windings and spindle, said removable portion of said cover member abutting said fixed portion and enclosing said rectifier means, said rectifier means being detachably mounted to said spindle so that said rectifier means may be replaced upon removal of said removable portion of said cover.

3. A magnetic amplifier unit having a plurality of toroidal saturable core windings and having rectifier means, a central supporting spindle, said magnetic amplifier unit being sealed together within a single enclosed assembly with said saturable core windings adjacently mounted and axially clamped upon said spindle, a two part sealed casing member including a fixed portion and a removable portion, said spindle being secured within said fixed portion, said fixed portion enclosing said windings, insulating resin material filling the voids within said fixed portion, and means detachably mounting said rectifier means within said removable portion of said casing member thereby permitting access to and replacement of said rectifier means upon removal of said removable portion of said casing member.

4. A magnetic amplifier unit having a plurality of toroidal core transformer windings including toroidal saturable core reactor windings, toroidal core power transformer means, and toroidal core output transformer means, said unit also comprising a plurality of rectifier means, said magnetic amplifier unit being sealed together in a single enclosed assembly comprising a two part casing member including a fixed portion and a removable portion, spindle means secured within said fixed portion, means fastening said plurality of toroidal windings on said spindle within said fixed portion of said casing, insulating resin material filling the voids within said fixed portion, mounting means detachably fastening said rectifier means within said removable portion of said casing member thereby permitting access to and replacement of said rectifier means upon removal of said removable portion of said casing member.

References Cited in the file of this patent

UNITED STATES PATENTS

| | | |
|---|---|---|
| 1,272,166 | Young | July 6, 1918 |
| 1,680,910 | Pfiffner | Aug. 14, 1928 |
| 1,899,502 | Hachfeld | Feb. 28, 1933 |
| 1,959,513 | Weyandt | May 22, 1934 |
| 2,089,434 | Schermerhorn | Aug. 10, 1937 |
| 2,430,904 | Boldingh | Nov. 18, 1947 |
| 2,491,031 | Burgess | Dec. 13, 1949 |
| 2,574,783 | Hedding | Nov. 13, 1951 |

FOREIGN PATENTS

| | | |
|---|---|---|
| 8,508 | Austria | July 25, 1902 |
| 270,370 | Great Britain | May 9, 1927 |
| 759,121 | France | Jan. 29, 1934 |